US008098643B2

(12) United States Patent
Li et al.

(10) Patent No.: US 8,098,643 B2
(45) Date of Patent: Jan. 17, 2012

(54) METHOD OF INCREASING THE CAPACITY OF THE FORWARD LINK MAC CHANNEL IN A WIRELESS COMMUNICATION SYSTEM

(75) Inventors: Gang Li, Bridgewater, NJ (US); Ming Lu, Hillsborough, NJ (US); Jialin Zou, Randolph, NJ (US)

(73) Assignee: Alcatel Lucent, Paris (FR)

( * ) Notice: Subject to any disclaimer, the term of this patent is extended or adjusted under 35 U.S.C. 154(b) by 1160 days.

(21) Appl. No.: 11/509,406

(22) Filed: Aug. 24, 2006

(65) Prior Publication Data

US 2008/0049699 A1 Feb. 28, 2008

(51) Int. Cl.
*H04B 7/216* (2006.01)
(52) U.S. Cl. ......................................... 370/342; 455/522
(58) Field of Classification Search .................... 370/235
See application file for complete search history.

(56) References Cited

U.S. PATENT DOCUMENTS

| 6,587,447 | B1 * | 7/2003 | Wang et al. | 370/335 |
|---|---|---|---|---|
| 2002/0064135 | A1 * | 5/2002 | Chen et al. | 370/252 |
| 2002/0196752 | A1 * | 12/2002 | Attar et al. | 370/331 |
| 2003/0021243 | A1 * | 1/2003 | Hamalainen | 370/329 |
| 2004/0037224 | A1 * | 2/2004 | Choi et al. | 370/235 |
| 2004/0258096 | A1 * | 12/2004 | Yoon et al. | 370/498 |
| 2004/0266466 | A1 | 12/2004 | Kim et al. | 455/509 |
| 2006/0007880 | A1 * | 1/2006 | Terry | 370/328 |
| 2007/0015476 | A1 * | 1/2007 | Akbar Attar et al. | 455/127.1 |

FOREIGN PATENT DOCUMENTS

WO WO 2007/078160 A 7/2007

OTHER PUBLICATIONS

PCT/US2007/018291, Feb. 25, 2008, International Search Report.
Lucent Pending U.S. Appl. No. 11/331,994, filed Jan. 13, 2006 (Vasudevan 17-12).

* cited by examiner

*Primary Examiner* — Dwayne Bost
*Assistant Examiner* — Joseph Dean, Jr.
(74) *Attorney, Agent, or Firm* — Williams, Morgan & Amerson, PC

(57) ABSTRACT

In an H-ARQ system, when the AN is receiving packet data traffic on the RL from an AT and is generating ACKs and NAKs according to the ability of the AN to properly decode such data, the AN gates-off a DRCLock bit within in a sub-packet duration in which an ACK is transmitted on the FL MAC channel. When it receives an ACK, the AT ignores the non-transmitted DRCLock bit in a current sub-packet duration, and assumes that the DRC channel is "good". When the AN sends a NAK to the AT, it also sends the DRCLock bit. When the AT receives a NAK in a sub-packet duration, it reads and processes whatever DRCLock bit is received during that sub-packet duration. When no data traffic is transmitted on the RL traffic channel, corresponding DRCLock bits are not gated-off by the AN and are transmitted to the AT. The AT then processes the received DRCLock bits. In an alternative embodiment, transmission of DRCLock is totally eliminated.

13 Claims, 3 Drawing Sheets

METHOD OF INCREASING THE CAPACITY OF THE FORWARD LINK MAC CHANNEL IN A WIRELESS COMMUNICATION SYSTEM

TECHNICAL FIELD

This invention relates to wireless communications.

BACKGROUND OF THE INVENTION

In accordance with CDMA2000 EVDO RevA/RevB standards, the forward link (FL) MAC (Medium Access Control) channel carries an ACK/NAK (ACKnowledgment/Negative AcKnowledgment) sub-channel, a Reverse Link (RL) Power Control Bit (PCB) sub-channel, and a Data Rate Control (DRC) Lock (DRCLock) sub-channel. The Access Network (AN) communicates with a plurality of Access Terminals (ATs) using different Walsh codes. In communicating with each AT, the ACK/NAK bits transmitted by the AN are used to support the H-ARQ (Hybrid Automatic. Repeat Request) of RL traffic transmissions; the RL PCBs are used for RL power control; and the DRCLock bits are used to indicate the quality of the RL DRC channel (i.e, good quality [in-lock], or bad quality [out-of-lock]). The DRC channel on the RL itself carries a request for the AN to send data traffic to the AT on the FL at a certain data rate.

Simulations and tests have shown that when the FL MAC channel is overloaded with simultaneous transmissions to multiple users, a high error rate of ACK/NAKs and PCBs results, thereby causing a delay increase and overall throughput reduction on the RL. Thus, while new technologies such as Interference Cancellation (IC) that can now be employed on the RL have the potential for significantly increasing the RL capacity, the limitations of the FL MAC capacity create a bottleneck, thereby acting as a limiting factor on any such ability to increase the RL traffic capacity.

Co-pending U.S. patent application Ser. No. 11/331,994, filed Jan. 13, 2006, discloses the use of ACK/NAK bits when data traffic is present, and DRC data quality indication bits when traffic is not present, for purposes of conducting closed-loop power control. The DRC data quality indication bits indicate the quality of the DRC data received on the RL DRC channel from an AT. As a result, the number of PCBs transmitted over the FL MAC channel can be reduced and the loading of the FL MAC channel relieved. The transmission of the DRCLock bits, however, continues to appear through simulations to be a big contributor of FL MAC channel loading and thus a limiting factor on RL traffic capacity.

SUMMARY OF THE INVENTION

In accordance with an embodiment of the present invention, in an H-ARQ system, when the AN is receiving packet data traffic on the RL from an AT and is generating ACKs and NAKs according to the ability of the AN to successfully decode such data, the AN gates-off (i.e., doesn't send) the DRCLock bit within a sub-packet duration in which an ACK is transmitted on the FL MAC channel.

In an embodiment, when it receives an ACK, the AT ignores whatever is received in the non-transmitted DRCLock bit position within a current sub-packet duration, and assumes that the DRC channel is "good" (i.e., that DRCLock="1").

In an embodiment, when the AN transmits a NAK to the AT, it also transmits a DRCLock bit. When the AT receives a NAK within a sub-packet duration, it reads and processes whatever DRCLock bit is received in that sub-packet duration.

In an embodiment, when no data traffic is transmitted on the RL traffic channel, corresponding DRCLock bits are not gated-off by the AN and are in fact transmitted to the AT. The AT then processes the received DRCLock bits.

In an embodiment, transmission of DRCLock bits is eliminated all together. In this embodiment, when RL data traffic is present, the AT determines whether or not the DRC channel is in-lock or out-of-lock according to the ACKs and NAKs received from the AN. When an ACK is received, the AT interprets it as a DRC in-lock. When a NAK is received and the statistical percentage of the number of received NAKs relative to ACKs over a predetermined period of time is greater than a predetermined threshold, then the AT decides that the DRC channel is "bad", i.e., is out-of-lock. When no RL data traffic is present, the AT determines whether the DRC is in-lock or is out-of-lock using DRC data quality indication bits received from the AN, as per the afore-noted co-pending patent application. If the received DRC data quality indication is "good", the AT interprets it as DRC in-lock. If the received DRC quality indication is "bad", then, if the statistical percentage of "bad" DRC quality indications relative to "good" DRC quality indications received over a predetermined period of time is greater than a predetermined threshold, the AT decides that the DRC channel is out-of-lock.

BRIEF DESCRIPTION OF THE DRAWING

The present invention will be better understood from reading the following description of non-limiting embodiments, with reference to the attached drawings, wherein below.

DETAILED DESCRIPTION

Although the following description is in accordance with CDMA2000 EVDO RevA/RevB standards and uses terminology commonly associated with that standard, it should be understood that the present invention could be used in other embodiments. The term Access Terminal, AT, should thus be understood to encompass any type of wireless terminal, cell phone, user equipment, etc. and the term Access Network, AN, should be understood to encompass any type of wireless communication network that includes a base station, base transceiver station, mobile switch, or other equivalent terminal with which a wireless terminal directly communicates. An ACK and a NAK represent any type of positive and negative acknowledgments that received data has been respectively successfully or unsuccessfully decoded.

Figure 1:
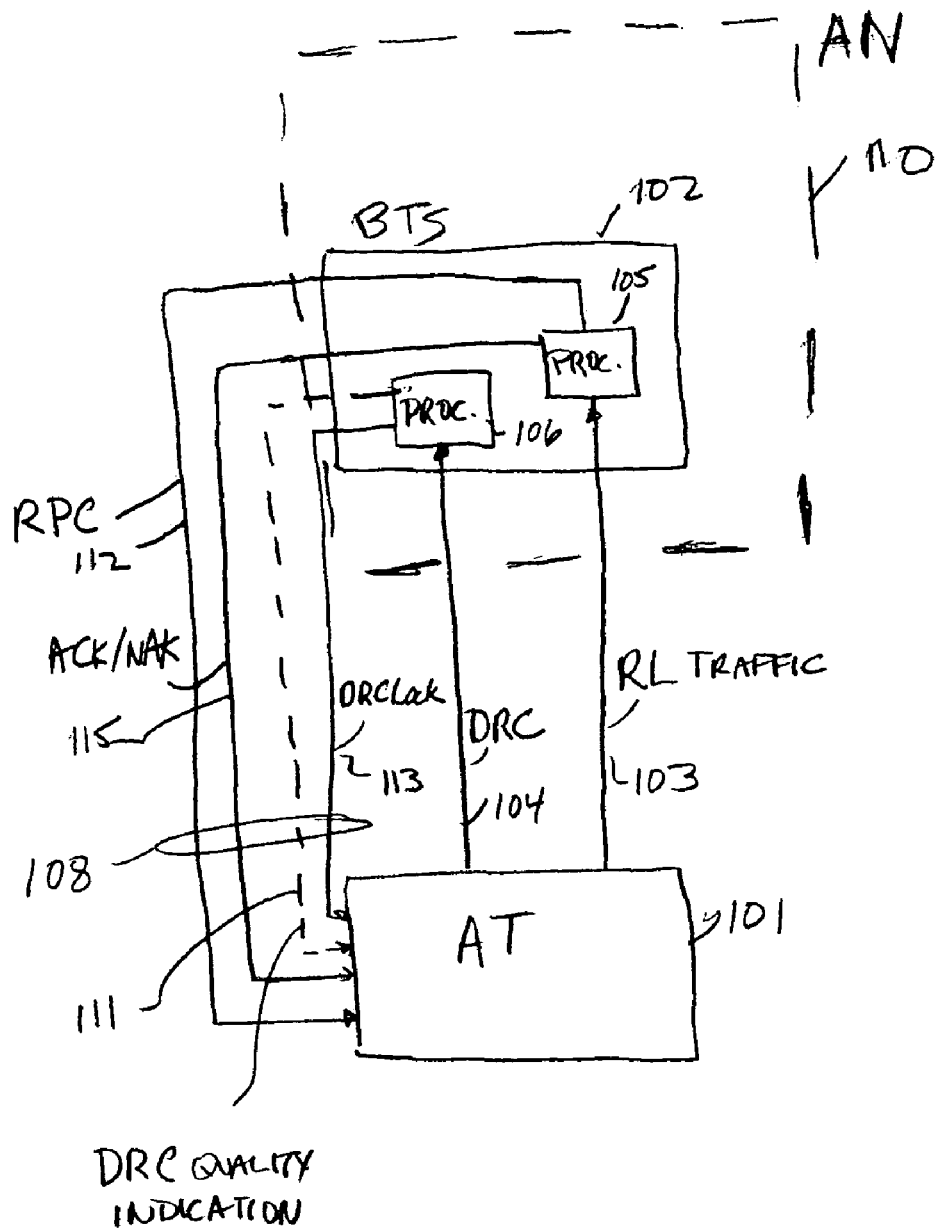
FIG. 1 is a block diagram of a prior art wireless communication system in accordance with CDMA2000 EVDO RevA/RevB standards in which embodiments of the present invention can be incorporated.

With reference to FIG. 1, in a prior art wireless communication system 100 in accordance with CDMA2000 EVDO RevA/RevB standards, AT 101 transmits data to a Base Transceiver Station (BTS) 102 within AN 110 over the RL traffic channel 103. Depending on it length, data is transmitted in multiple sub-packets, each sub-packet consisting of four slots, each slot having a duration of 1.667 ms. AT 101 also transmits on DRC channel 104 a rate request for the AN to transmit data to it. A processor 105 in BTS 102 processes the data sub-packets received over RL traffic channel 103 and generates either an ACK or a NAK on sub-channel 115, indicating, respectively, a successful or unsuccessful decoding of each transmitted sub-packet. Processor 105 also generates, according to the afore-noted EVDO standard, RL Power Control (RPC) bits (PCBs), which are transmitted on sub-channel 112 over the MAC channel 108 to the AT requesting it to increase or decrease its transmit power. A processor 106 in BTS 102, which may be separate from or integrated with processor 105, processes the data rate request transmitted by AT 101 on DRC channel 104. The functions of processors 105 and 106 in an actual embodiment are likely to be integrated with the general processing functionalities of a common BTS processor that performs control functions and traffic processing at the BTS. Processor 106 determines whether the quality of DRC channel 104 is "good" or "bad", and outputs DRCLock bits, on sub-channel 113, in which a "1" indicates a "good", in-lock, channel, and which a "0" indicates a "bad", out-of-lock, channel. The MAC channel 108 transmitted by BTS 102 includes the ACK/NAK sub-channel 115, the reverse link power control sub-channel 112, the DRCLock sub-channel 113, and potentially a DRC channel quality indication sub-channel 111, which in accordance with the afore-noted co-pending patent application, is indicative of the quality of the DRC data received on DRC channel 104. The latter is shown in FIG. 1 as a dotted connection between BTS 102 and AT 101 to indicate that this sub-channel is optional. The ACK/NAK sub-channel and the DRCLock sub-channel are time-division multiplexed and transmitted in one out of every four slots.

In order to reduce the load on the MAC channel, the present invention reduces the transmission of DRCLock by the AN. Since it is unlikely that the DRC channel is "bad" while the RL traffic channel reception is "good", when the traffic conditions are "good", it is most likely that the DRC channel is in-lock. If, on the other hand, traffic conditions are "bad", then the DRC channel may be in-lock or out-of-lock.

In a first embodiment, the AN partially gates-off and doesn't always transmit DRCLock bits. Specifically, when the AN successfully decodes a sub-packet received on the RL traffic channel and is transmitting an ACK back to the AT, the DRCLock bit in the same sub-packet duration is gated-off and thus not transmitted on the MAC channel to the AT. When the AT receives an ACK in a response to a transmitted traffic sub-packet, it ignores the DCRLock bit in the current sub-packet duration and assumes a DCRLock bit of "1". When the AN is unsuccessful in decoding a received traffic sub-packet and is responding to that sub-packet with a NAK, then the associated determined DRCLock bit is not gated-off and is transmitted over the MAC channel back to the AT. The AT, when it receives a NAK, reads and decodes the DRCLock bit in that current sub-packet duration. When no traffic data is being received on the RL from the AT, the AN continues to transmit a DRCLock bit in its predetermined timeslots and AT will read them accordingly.

Figure 2:
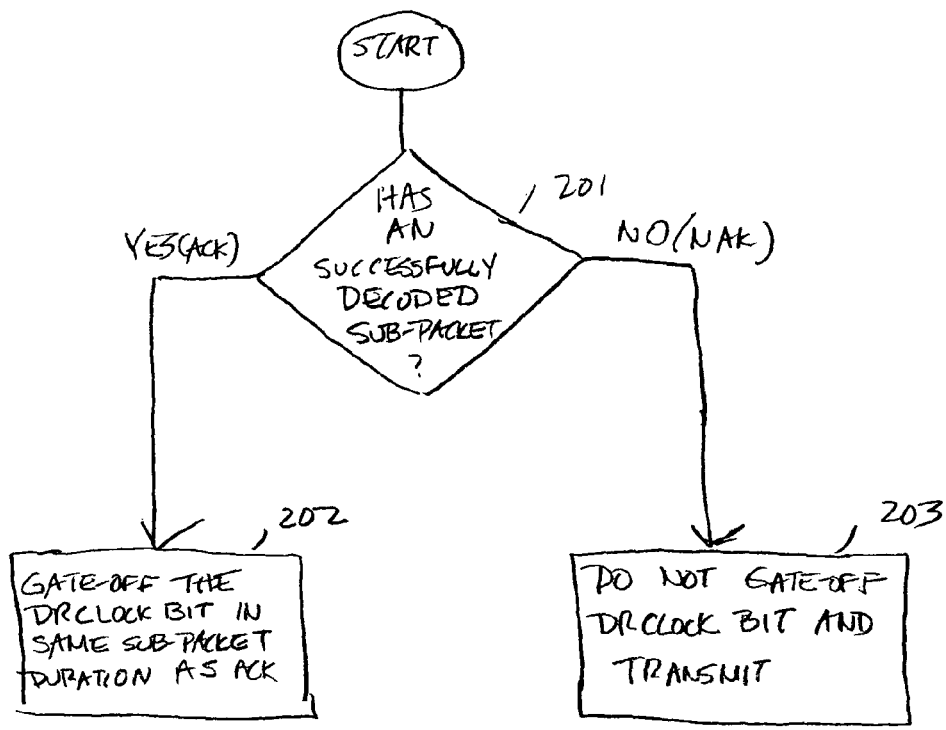
FIG. 2 is a flowchart showing the processing at the AN in accordance with an embodiment of the present invention.

FIG. 2 is a flowchart showing the steps at the AN in accordance with this embodiment when traffic data is being received from the AT over the RL. At step 201 a determination is made whether the AN has successfully decoded a sub-packet. If yes, and it is generating an ACK, at step 202, the DRCLock bit is gated-off in the same sub-packet duration as the ACK and is not transmitted on the MAC channel to the AN. If the AN has not successfully decoded the sub-packet at step 202 and is generating a NAK, then, at step 203, the DRCLock bit in the same sub-packet duration is not gated-off and is transmitted on the MAC channel to the AN.

Figure 3:
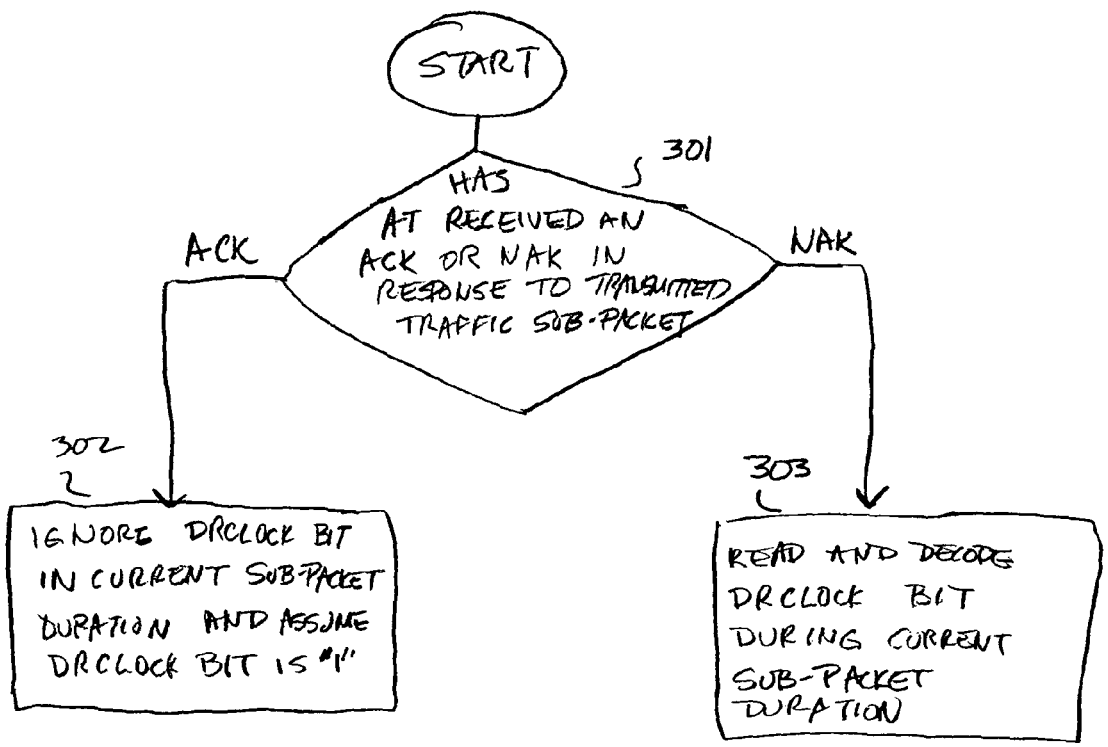
FIG. 3 is a flowchart showing the processing at the AT in accordance with an embodiment of the present invention.

FIG. 3 is a flowchart showing the corresponding steps at the AT in accordance with this embodiment when it is transmitting traffic data over the RL. At step 301, a determination is made whether the AT has received an ACK or a NAK in response to a transmitted traffic sub-packet. If an ACK is received, at step 302, the AT ignores the DRCLock bit in the current sub-packet duration and assume that the DRCLock bit is "1". If a NAK is received, at step 303, the AT reads and decodes the DRCLock bit during the current sub-packet duration.

In a second embodiment, the DRCLock channel is totally eliminated and decisions are made by the AT about DRCLock are derived from the received ACKs and NAKs when there is traffic data on the RL, and from DRC data quality indications received on the MAC channel from the AN when there is no data traffic. In this embodiment, therefore, the AN doesn't transmit DRCLock during any sub-packet duration.

If there is data traffic on the RL, then the ACKs/NAKs generated at the AN in response to the data traffic received from the AT on the RL and fed back to the AT on the MAC channel are used to derive DCRLock. Specifically, when the AT receives an ACK during a sub-packet duration, it interprets that as DRC in-lock. When, however, the AT receives a NAK during a sub-packet duration, it determines from the statistics of received NAKs whether an internal predetermined criterion has been triggered and decides, if triggered, that the DRC channel is out-of-lock. Particularly, if the percentage of NAKs that have been received over a predetermined plurality of previous sub-packet durations as compared to the percentage of ACKs that have been received over those same sub-packet durations is greater than a predetermined threshold, then the received NAK is interpreted as DRC out-of-lock.

If there is no data traffic on the RL traffic channel, then the afore-noted DRC data quality indication that is fed back by the AN to the AT is used to derive DRCLock. If during a sub-packet duration the received DRC data quality indication is "good", then the AT interprets it a DRC in-lock. When, however, the AT receives a "bad" DRC data quality indication during a sub-packet duration, it determines from the statistics of received DRC data quality indications whether an internal predetermined criterion has been triggered and decides, if triggered, that the DRC channel is out-of-lock. Particularly, if the percentage of "bad" DRC data quality indications that have been received over a predetermined plurality of previous sub-packet durations as compared to the percentage of ACKs that have been received over those same sub-packet durations is greater than a predetermined threshold, then the received "bad" DRC data quality indication is interpreted as DRC out-of-lock.

Figure 4:
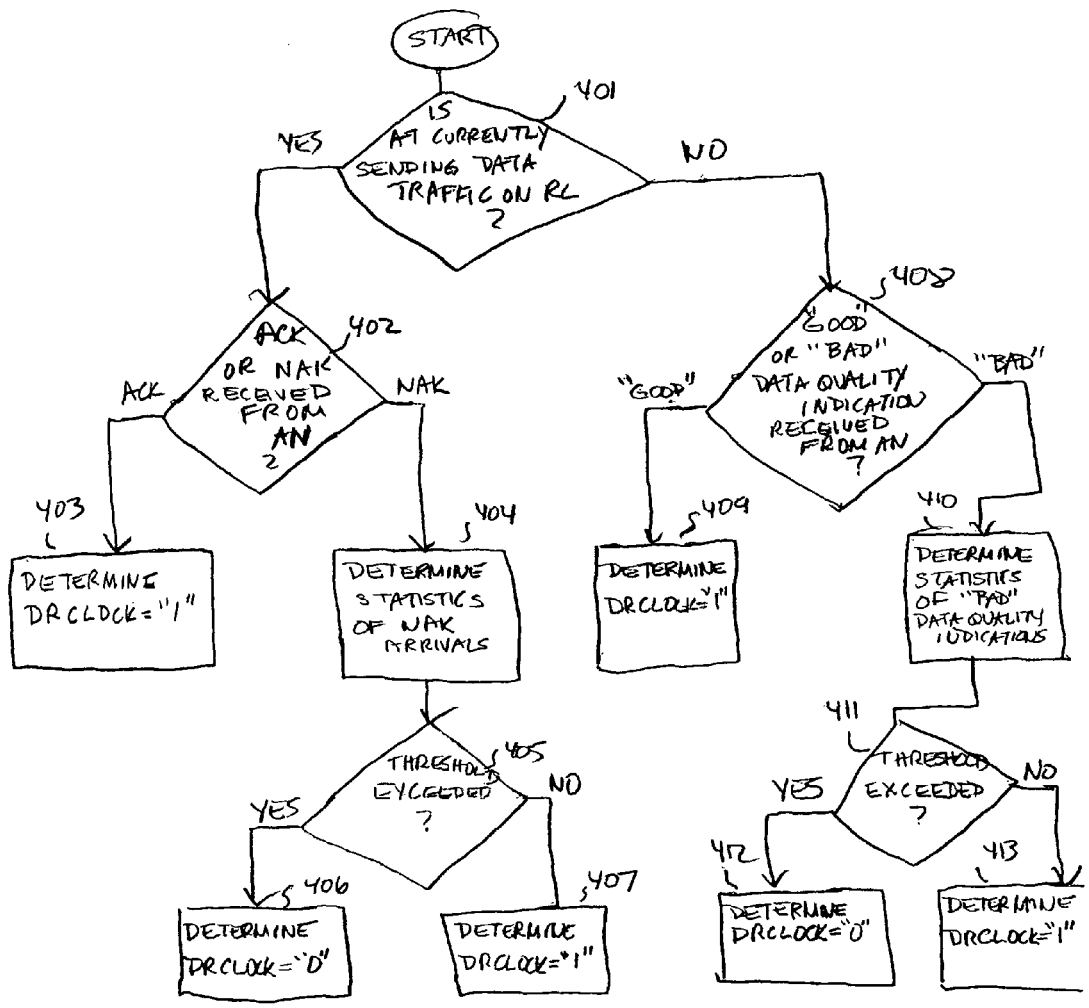
FIG. 4 is a flowchart showing the processing at the AT in accordance with a second embodiment of the present invention.

FIG. 4 is a flowchart that summarizes the above-described functions at the AT when transmission by the AN of the DRCLock is eliminated. At step 401, a determination is made whether the AT is currently sending data traffic sub-packets on the RL. If yes, at step 402, the AT determines whether a responsive ACK or NAK has been received from the AN. If an ACK is received in response to a transmitted sub-packet, then, at step 403, the AT interprets that ACK as DRC in-lock (i.e. DRCLock="1"). If a NAK is received, at step 404, the statistics of NAK arrivals are determined. At step 405, these statistics are compared with a predetermined threshold. If the threshold is exceeded, at step 406, the AT interprets the received NAK as DRC out-of-lock (i.e., DRCLock="0"). If the threshold is not exceeded, at step 407, the AT decides that that the DRC is in-lock. If, at step 401, the determination is made that the AT is not transmitting data traffic on the RL, then, at step 408, a determination is made whether a "good" or "bad" DRC data quality indication has been received during a current sub-packet duration. If a "good" DRC data quality indication is received, then, at step 409, the AT interprets that "good" DRC data quality indication as DRC in-lock (i.e. DRCLock="1"). If a "bad" data quality indication is received, at step 410, the statistics of "bad" DRC data quality indications are determined. At step 411, these statistics are compared with a predetermined threshold. If the threshold is exceeded, at step 412, the AT interprets the received "bad" DRC data quality indication as DRC out-of-lock (i.e., DRCLock="0"). If the threshold is not exceeded, at step 413, the AT interprets decides that the DRC is in-lock.

The above-described embodiments are illustrative of the principles of the present invention. Those skilled in the art could devise other embodiments without departing from the spirit and scope of the present invention.

The invention claimed is:

1. A method in a H-ARQ wireless communication system in which an access terminal (AT) communicates with an access network (AN) over a reverse link (RL) and a forward link (FL), the RL including a Date Rate Control (DRC) channel the method comprising:
   at the AN:
   when an ACK is generated in response to a successfully decoded data packet that is received from the AT on the RL, during a sub-packet duration during which the ACK is transmitted to the AT, gating off transmission on the FL of a determined indication whether the DRC channel is in-lock or out-of-lock.

2. The method of claim 1 wherein the indication whether the DRC channel is determined to in-lock or out-of-lock is a DRCLock.

3. The method of claim 2 further comprising gating off transmission on the FL of the DRCLock at all times.

4. The method of claim 1 further comprising:
   when a NAK is generated in response to an unsuccessfully decoded data packet that is received from the AT on the RL, during a sub-packet duration during which the NAK is transmitted to the AT, transmitting on the FL a determined indication of whether the DCR channel is in-lock or out-of-lock.

5. A method in a H-ARQ wireless communication system in which an access terminal (AT) communicates with an access network (AN) over a reverse link (RL) and a forward link (FL), the RL including a Date Rate Control (DRC) channel the method comprising:
   at the AT:
   when an ACK is received from the AN in response to a successful decoding by the AN of a data sub-packet transmitted by the AT, ignoring during a current sub-packet duration in which the ACK is received any one or more bits that would otherwise contain an indication of whether the DRC channel is in-lock or out-of-lock and deciding that the DRC channel is in-lock.

6. The method of claim 5 wherein the indication whether the DRC channel is determined to in-lock or out-of-lock is a DRCLock.

7. The method of claim 5 wherein when a NAK is received from the AN in response to an unsuccessful decoding by the AN of a data sub-packet transmitted by the AT, determining whether the DRC channel is in-lock or out-of-lock by decoding during the current sub-packet duration in which the NAK is received the one or more bits that contain the indication of whether the DRC channel is in-lock or out-of-lock.

8. A method in a H-ARQ wireless communication system in which an access terminal (AT) communicates with an access network (AN) over a reverse link (RL) and a forward link (FL), the RL including a Date Rate Control (DRC) channel but the AN is not given an FL channel for transmitting DRCLock bits, the method comprising:
   at the AT while no FL channel is allocated for transmitting DRCLock bits:
   when an ACK is received from the AN in response to a successful decoding by the AN of a data sub-packet transmitted by the AT, determining that the DRC channel is in-lock.

9. The method of claim 8 further comprising:
   when a NAK is received from the AN in response to an unsuccessful decoding by the AN of a data sub-packet transmitted by the AT, determining whether the DRC channel is in-lock or out-of-lock from the statistics of the NAKs received over time from the AN.

10. The method of claim 9 wherein the DRC channel is determined to be out-of-lock when the percentage of NAKs received relative to the percentage of ACKs received over a predetermined period of time is greater than a predetermined threshold and is determined to be in-lock when the percentage of NAKs received relative to the percentage of ACKs received over the predetermined period of time is less than the predetermined threshold.

11. A method in a H-ARQ wireless communication system in which an access terminal (AT) communicates with an access network (AN) over a reverse link (RL) and a forward link (FL), the RL including a Date Rate Control (DRC) channel but the AN is not given an FL channel for transmitting DRCLock bits, the method comprising:
   at the AT while no FL channel is allocated for transmitting DRCLock bits:
   when the AT is not transmitting data traffic on the RL and a DRC data quality indication received from the AN is "good", determining that the DRC channel is in-lock.

12. The method of claim 11 further comprising:
   when the AT is not transmitting data on the RL and a DRC data quality indication received from the AN is "bad", determining whether the DRC channel is in-lock or out-of-lock from the statistics of "bad" data quality indications received over time from the AN.

13. The method of claim 12 wherein the DRC channel is determined to be out-of-lock when the percentage of "bad" DRC data quality indications received relative to the percentage of "good" DRC data quality indications received over a predetermined period of time is greater than a predetermined threshold and is determined to be in-lock when the percentage of "bad" DRC data quality indications received relative to the percentage of "good" DRC data quality indications received over the predetermined period of time is less than the predetermined threshold.

* * * * *